June 21, 1927.
C. S. WRAY
BELT CONVEYER
Filed Aug. 10. 1925
1,633,153
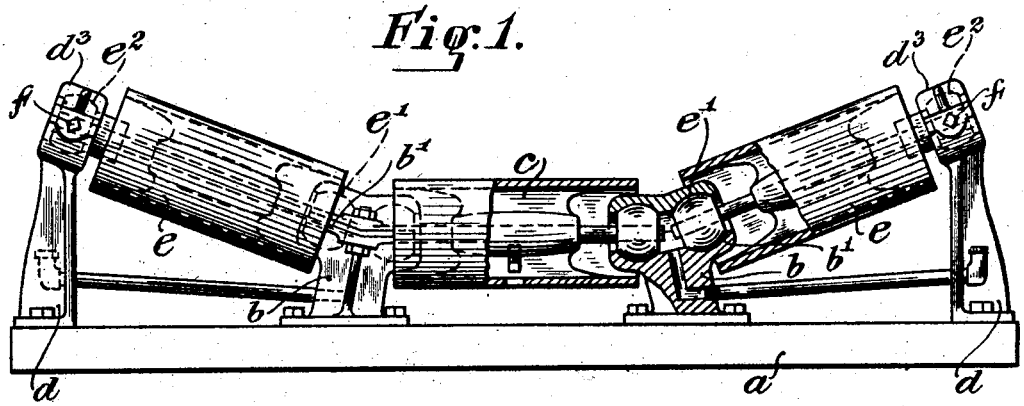
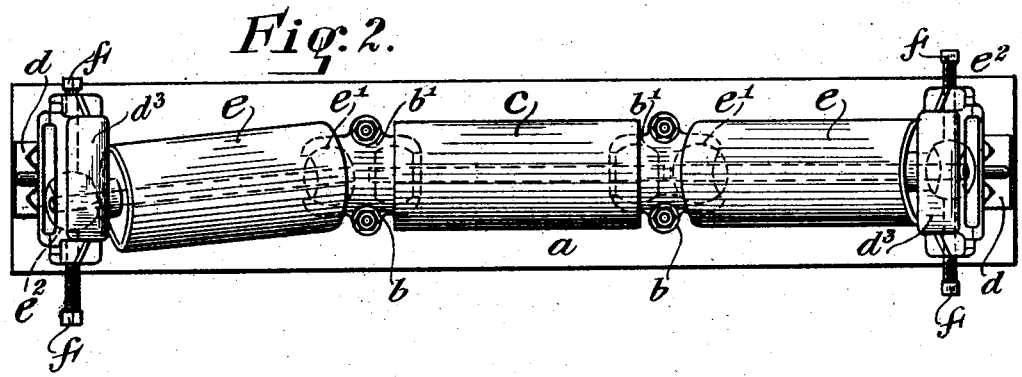
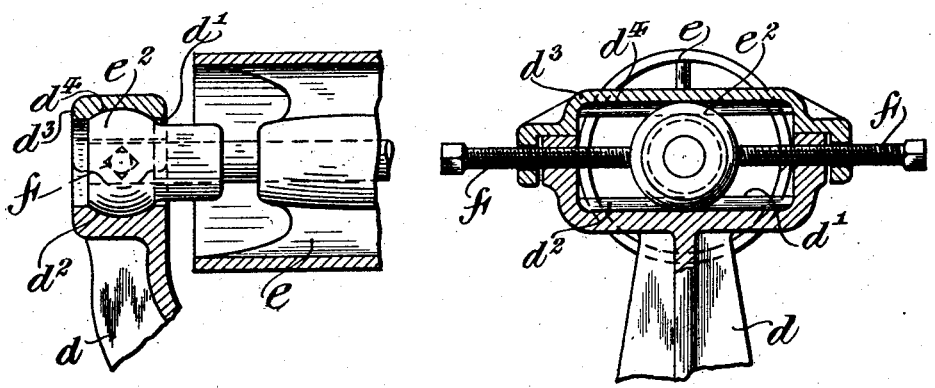
INVENTOR
Charles S. Wray
BY
Redding Greeley O'Shea & Campbell
HIS ATTORNEYS Patented June 21, 1927.

1,633,153

UNITED STATES PATENT OFFICE.

CHARLES S. WRAY, OF ATLANTIC HIGHLANDS, NEW JERSEY.

BELT CONVEYER.

Application filed August 10, 1925. Serial No. 49,201.

Traveling belts supported on idlers if not constrained by lateral forces, have a tendency to run in a rather unstable fashion, that is, to ride up on the idlers in one direction or another. In mounting idlers for such belts on brackets which are permanently secured to the base, it is practically impossible as a matter of design, workmanship and skill, to insure that the belt shall run a true course. To meet this condition, it has become the practice to provide an inclined base on which the brackets are supported in a slightly tilted position so as to throw the higher ends of the troughed pulleys slightly out of line with their lower ends so as to set up lateral constraining forces on the belt. For instance, in an idler having three pulleys, if the brackets are thus tilted, the outer ends of the two inclined pulleys are thrown out of line with their lower ends so that both outside pulleys tend to direct the belt towards the center line. These unbalanced but opposed forces serve effectively to prevent the belt from creeping. However, this method has the disadvantage of introducing an unnecessary degree of lost power and of giving in the installation only the roughest approximation of the setting desired. Instead of merely counteracting an unbalanced force on the belt, it is necessary to go further and introduce two unbalanced but opposed forces which are superior to the one unbalanced force which is sought to be corrected. Obviously, this practice is not sound.

In accordance with the present invention, it is proposed to mount such pulleys of an idler as it is thought desirable to provide an angular adjustment for, whereby the axis of any such pulley may be swung more or less to impress more or less counterforces on the belt. Stated in relation to the simplest embodiment, it is proposed in a three-pulley troughing idler to mount the end bearings for the inclined pulleys adjustably so that the bearings may be moved bodily to swing the axes of such pulleys and thereby incline the pulleys to the center line of the belt.

In addition to accomplishing the broad objects of the invention stated herein, it is further proposed to provide means which shall be of simple form for effecting the necessary adjustments.

The invention will now be described with reference to a simple embodiment thereof, illustrated in the accompanying drawings, wherein:

Figure 1 is a view showing a troughing idler having three pulleys, the inclined pulleys being journalled in adjustable bearings in accordance with the invention, parts being broken away to show other details.

Figure 2 is a view in plan of the idler shown in Figure 1, with the pulley at the left moved angularly.

Figure 3 is a fragmentary detail view in transverse section through the supporting frames of one of the adjustable bearings.

Figure 4 is a view in section through the frame shown in Figure 3 and at right angles thereto.

The invention is not to be limited to any particular form of idler or pulley, or to the number thereof, or the nature of the brackets, base or bearings. The accompanying drawings are merely illustrative of a simple idler employing three pulleys in troughing relation for the support of a belt.

As shown in Figure 1, the base $a$ has bolted thereon brackets $b$ for the center pulley $c$, and brackets $d$ for the outer ends of the inclined rolls $e$, these rolls being journaled at their inner ends in the brackets $b$ if desired, or in separate brackets. With an idler of the character described, it may be that the belt will tend to run out when the parts are assembled. To counteract this tendency, one practice which has grown up has been to tilt the supporting brackets, $b$, $d$, as by inclining the upper face of the base $a$. Such tilting throws the outer ends of the inclined rolls $e$ out of line with their inner ends since the brackets are of different heights, with the result that these outer rolls impress constraining lateral forces on the belt and tend to throw it towards the center. Since these forces are opposed, the belt is prevented from running out of line. Naturally, the imposition of such forces means loss of power. Further, no means for accomplishing a nice adjustment have ever been provided.

In accordance with the present invention, it is proposed to journal the inner ends of the inclined rolls $e$ in such manner as to afford capacity for angular movements in the planes of the respective rolls. For instance, the bearing boxes $e'$ at the inner ends of these rolls are shown as of spherical form and journaled in split sockets $b'$ in the brackets $b$. The outer ends of the rolls are journaled in bearing boxes $e^2$, which are slidably supported in elongated openings $d'$ provided therefor at the upper ends of the brackets $d$. A simple way of providing this mounting is to form the upper end of the bracket $d$ with a groove $d^2$ at the bottom of the elongated slot and to close the slot by a suitable cap $d^3$, which may have a complementary groove $d^4$ therein, the bearing $e^2$ fitting within the slot and traveling within the grooves $d^2$, $d^4$. Adjusting screws $f$ may extend loosely through openings in the overlying cap $d^3$ and be threaded through the bracket $d$ and extend in opposite directions into the slot $d'$ and engage the bearing box $e^2$, preferably at diametrical points. From this description it will be evident that through proper adjustment of the screws $f$ the bearing box $e^2$ may be moved along the slot $d'$ in one direction or another, thereby swinging the rolls $e$ angularly about their inner bearings $e'$.

Figure 2, for instance, shows the left-hand pulley $e$ swung angularly by movement of the bearing box $e^2$.

The means described thus far are such as will permit the broad objects of the invention to be achieved, although the invention is not to be limited in its broader aspects to the particular means. The method of operation should now be clear. Care in setting up the brackets, $b$, $d$, and the rolls therein need not be exercised. When all the parts are assembled on the base $a$ and the belt operated along the pulleys, note will be taken of the course which it tends to run out on. At once it may be determined by inspection where a counterforce must be impressed on the belt to make it run true. Either the left-hand pulley $e$ or the right-hand pulley $e$ will accordingly be swung forwardly or rearwardly in relation to the travel of the belt, or both of these pulleys will be swung slightly in the same or opposite directions until all of the forces impressed on the belt are exactly neutralized and its course is true. A very nice adjustment becomes possible by the illustrated means, since the course of the belt may be observed during the adjusting and the adjustment will extend only to the point where the forces are neutralized. The adjusting means are accessible at all times and all of the idlers may be equipped for adjustment or only a predetermined number thereof in an entire conveyer system. Ordinarily it will not be necessary to provide an adjustment for center pulley $c$, nor will it be necessary to swing both troughing idlers. The result secured, however, is positive and efficiency is achieved by making it unnecessary to impress undue restraining forces on the belt.

As indicated before, changes in details of the supporting means for the pulleys and the adjustment may be made without departing from the spirit of the invention.

What I claim is:

1. In an idler for belt conveyers, comprising a plurality of pulleys, means to move one of said pulleys angularly with respect to the course of the belt and the vertical plane of the transverse axis thereof.

2. In troughing idlers for belt conveyers, a plurality of pulleys, means to support certain of the pulleys at an angle to the horizontal, and means to move one of said last named pulleys angularly with respect to the vertical plane of the transverse axis of the idler.

3. In troughing idlers, a plurality of pulleys, means to journal the outer pulleys with capacity for swinging movements and adjustable means to swing said pulleys with respect to the vertical plane of the transverse axis of the idler.

4. In troughing idlers, troughing pulleys, means to journal the inner ends of the troughing pulleys with capacity for swinging movements, means to hold the inner ends of said troughing pulleys against displacement, and adjustable means in which the outer ends of said troughing pulleys are journaled, whereby such pulleys may be moved angularly on their own axes and in the plane of the direction of movement of the belt.

5. In an idler in combination with a base, a plurality of troughing pulleys, brackets in which said pulleys are journaled, means to secure the brackets fixedly to the base and means to swing one of the troughing pulleys angularly with respect to the plane of the brackets.

6. In combination with a troughing pulley, a bearing box in which the end of the pulley is journaled, a bracket to support the bearing box and means to slide the bearing box in a plurality of directions in the bracket.

7. In an idler, a horizontal pulley, brackets in which it is supported, inclined troughing idlers, brackets in which said troughing idlers are journaled and adjustable means to move the outer ends of the troughing idlers to move the pulleys angularly with respect to the vertical plane of the horizontal pulley.

This specification signed this 7th day of August, A. D. 1925.

CHAS. S. WRAY.